Patented June 2, 1953

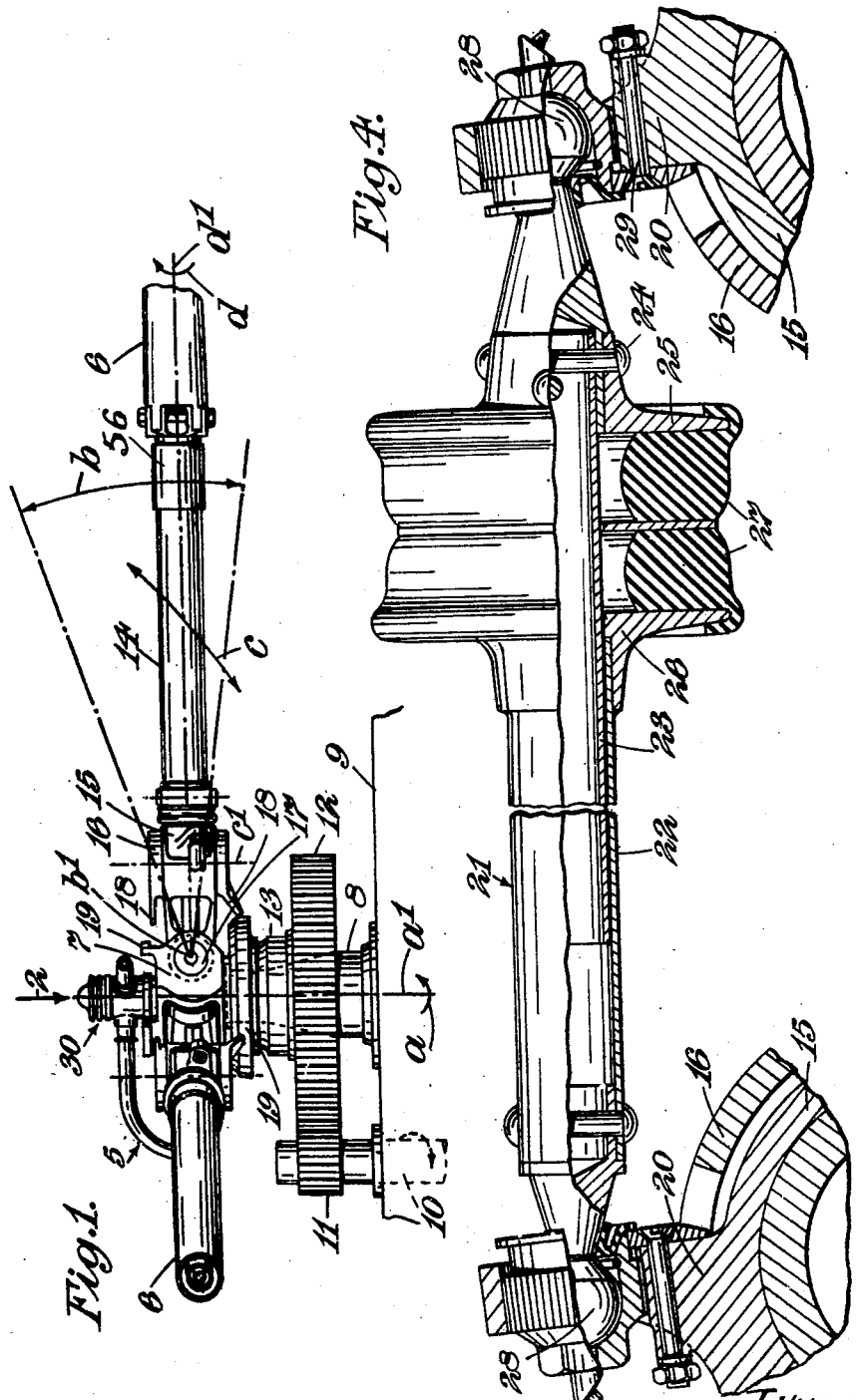

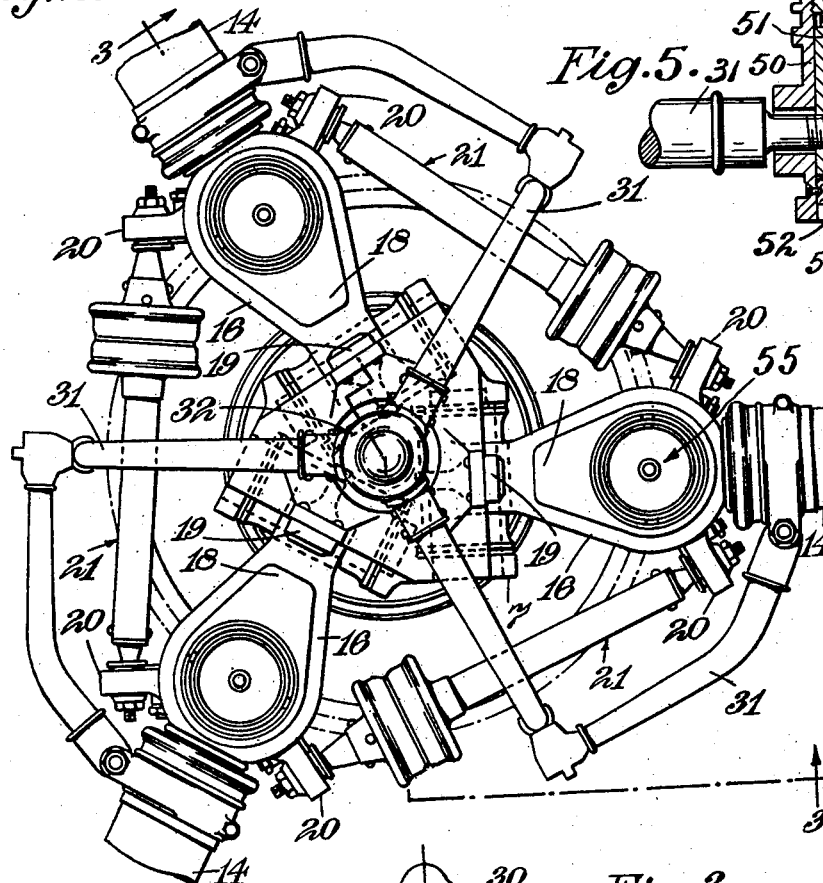
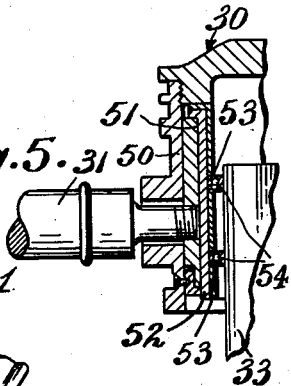
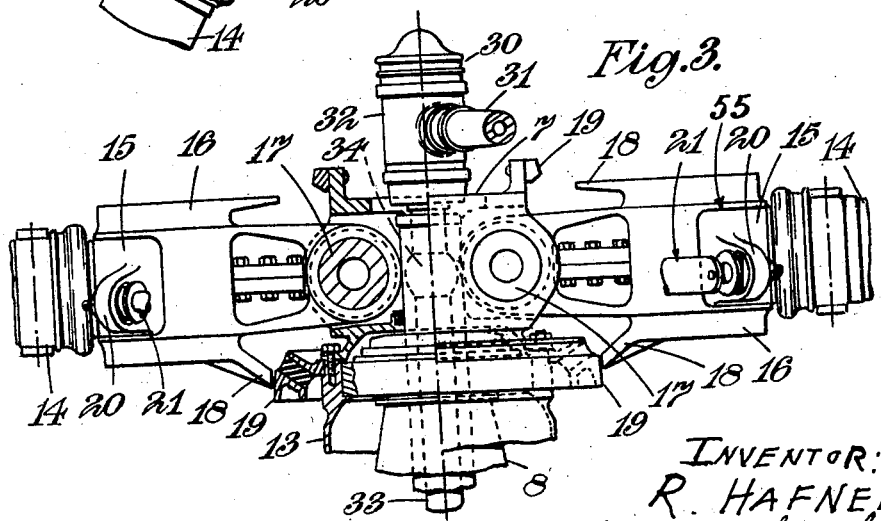

2,640,553

UNITED STATES PATENT OFFICE 2,640,553

IMPELLER MOVEMENT DAMPING DEVICE

Raoul Hafner, Bristol, England, assignor to The Bristol Aeroplane Company Limited, Bristol, England, a British company Application June 3, 1947, Serial No. 752,262
In Great Britain May 30, 1946

Section 1, Public Law 690, August 8, 1946
Patent expires May 30, 1966

5 Claims. (Cl. 170—160.25)

This invention concerns sustaining rotors for rotary-wing aircraft.

The rotor blades of a rotary wing aircraft, for example a helicopter, may perform the following movements:

(a) Rotation of the blades about a common axis, that is, the rotor axis.

(b) An independent movement of each blade about an axis normal to the rotor axis and to the long axis of the blade—such movements are commonly referred to as flapping movements and the axis of movement is referred to as the flapping axis.

(c) An independent movement of each blade about an axis parallel to the rotor axis which movement either serves to advance or to retard the blade depending on whether it results in the blade moving ahead of or to behind its radial position. Such movements are referred to as drag movements and the axis about which they take place as the drag axis.

(d) A movement of each blade about the longitudinal axis of the blade to change the pitch thereof.

The movements $b$ to $d$ referred to may be either of a cyclic or of an irregular nature.

Cyclic movements of the rotor blades exist generally when the aircraft is operating under steady forward and translational flight conditions and are expressible by a Fourier series of the type—

$$b = a_0 + a_1 \sin \alpha + b_1 \cos \alpha + a_2 \sin 2\alpha + b_2 \cos 2\alpha + \ldots$$

in which $a_0$ is a constant, the term $$(a_1 \sin \alpha + b_1 \cos \alpha)$$

is the first harmonic of the movement, the term $(a_2 \sin 2\alpha + b_2 \cos 2\alpha)$ is the second harmonic of movement, and so on where $\alpha$ is the blade azimuth angle.

As applied to flapping of the blades this means that the resultant movement of any blade at any instant (referred to an appropriate datum $\alpha$) is expressible as a constant, commonly called coning, a flapping movement of first order frequency which may be of relatively large magnitude, and flapping movements of the second and higher order of frequencies which are generally of small magnitude compared with the first order term.

As regards drag movements (when the Fourier series is expressed in terms of angular displacement), the angular displacement of any blade is definable at any instant relatively to a convenient datum (for example, the true radial position of the blade) as a constant angle and an angle varying cyclically with first and higher orders of frequency. The constant angle depends on the mean drag of the blade, being zero for auto-rotation of the blades and having a negative value for helicopter flight conditions in which the blade lags behind the radial position. The value of the constant angle changes with changing conditions of flight and the range within which it changes may be as much as 20°. The cyclic variations of angle are due to the changing conditions of the blade during rotation and they cause considerable inertia forces which require damping. The range of these cyclic movements is generally quite small, say not more than 2°. It is desirable that the rotor blades be readily adjustable within the limits of the large displacements to ensure satisfactory control and operation of the aircraft. It follows, therefore, that any damping imposed on these large displacements should be light. So far as the cyclic displacements are concerned, since these are of relatively small magnitude and represent in the main disturbing factors in the operation of the aircraft, it is desirable that they be heavily damped.

In use the rotor is subject to sudden or uneven disturbing movements as occur, for instance, in a helicopter on starting up, on varying the power applied to the rotor, on changes in the flight conditions and upon sudden gusts of wind striking the rotor. If these disturbing movements are allowed to displace the blades from their correct angular and/or coning relationship they may cause unbalance and instability resulting in serious vibration or failure of the parts affected.

In order that rotor blades may have the minimum drag they are made thin and therefore flexible to bending in the transverse plane. The rotor blades therefore readily withstand the aerodynamic and centrifugal forces applied to them but are not capable of taking transverse bending forces of any substantial magnitude, and it is therefore necessary to provide such freedom of movement of the blades as will materially reduce the sudden application of bending moments to them.

It follows therefore that for satisfactory operation and control of the rotor it is desirable:

1. That the rotor blades be maintained in correct angular and/or coning relationship.

2. That the constant term displacements which may be of relatively large magnitude be lightly damped.

3. That the cyclic displacements which are of relatively small magnitude be subjected to a high degree of damping in order that vibration may be reduced.

The object of the present invention is to provide a sustaining rotor for a rotary-wing aircraft which fulfils the above desiderata.

According to one aspect of the present invention a sustaining rotor for rotary-wing aircraft having a plurality of blades is characterised in that the blades are connected together to ensure that movements of relatively large magnitude are transmitted from one blade to the other(s) whilst permitting each blade independently to perform movements of relatively small magnitude.

According to another aspect of the invention a sustaining rotor for rotary-wing aircraft having a plurality of blades is characterised in that the blades are connected together to ensure that drag movements of a blade expressible by the constant term of a Fourier series are compressively free from restraint whilst movements expressed by the cyclic terms of the series are heavily damped and restrained.

According to another aspect of the invention a sustaining rotor for rotary-wing aircraft having a plurality of blades is characterised in that the blades are connected together to ensure that drag movements of a blade expressible by the constant term of a Fourier series and/or by any term of large magnitude are comparatively free from restraint whereas movements expressed by other cyclic terms are heavily damped and restrained.

According to yet a further aspect of the invention a sustaining rotor having a plurality of blades comprises apparatus for maintaining the blades, during rotation, in substantially equiangular relationship as measured in the plane of rotation of the rotor.

Preferably the apparatus for connecting the blades together comprises a tie-bar which extends from one blade to the next adjacent blade, each bar being connected to the blade element joint of the drag hinge by a universal joint.

A specific embodiment of the present invention will now be described, by way of example, with reference to the accompanying drawings whereof:

Figure 1 is a side elevation of a rotor head showing certain details in a diagrammatic manner, Figure 2 is a view of the head in the direction of arrow 2 of Figure 1, Figure 3 is a section on the line 3—3 of Figure 2, Figure 4 is a view to an enlarged scale and partly in section of a member of the rotor head shown in Figure 2, and Figure 5 is a section of a part of the rotor head showing certain details of construction thereof.

Referring first of all to Figure 1; the rotor head is generally indicated by the reference numeral 5 and comprises three blades 6 which are mounted on a hub 7 carried by a pylon 8 which is supported from the fuselage or cabin 9. The latter houses an engine (not shown) which drives a shaft 10 carrying a pinion 11 which meshes wth a gear 12. The latter is attached to a structure 13 to which the hub 7 is bolted. As a consequence the engine drives the hub 7 to rotate the blades 6 in the direction of arrow $a$ about the axis $a'$. The blades during rotation perform a flapping movement $b$ about axis $b'$ and a drag movement $c$ about axis $c'$. The pitch of the blades may be changed by rotating the blade in the direction $d$ about axis $d'$. The pitch of the blades is varied by moving each of them about its long axis $d'$ either to a datum value or cyclically during rotation of the rotor head 5. To vary the magnitude and sense of the cyclic pitch changes there is provided a spider 30, an arm 31 of which is connected to each blade 6. The nave 32 of the spider surrounds the upper end of a non-rotating control rod 33 which is supported within the hub 7 by a ball-and-socket joint generally indicated at 34. The rod 33 is therefore mounted for limited swinging movements to adjust the spider 30 and tilt it, the spider 30 constituting a connecting means for applying the control movements of the rod 33 to the blade 6. The spider rotates with the blades 21 upon the non-rotary rod 33 and for this purpose the nave 32 is mounted on the rod through the agency of roller bearings. The inner end of each arm 31 constitutes the slipper 50 (Figure 5) of a slipper bearing 51 and engages with a tubular member 52 which carries the outer race 53 of the roller bearings 54 referred to. With this construction the rotation of the spider 30 is allowed for by the roller bearings 54 and the backward and forward movements of each spider arm 31, due to the drag movements of its blade 6, are provided for by its associated slipper bearing 51.

Each blade 6 is attached to a root member 14 having, at one end, an integral lug 15 which is received between the forked arms of an intermediate coupling member 16 (Figure 3) a pin passing through the forked arms and the lug so that the member 14 (and hence the blades 6 carried thereby) is capable of drag movements about axis $c'$. The lug 15, coupling member 16 and associated pin comprise a hinged connection, generally indicated in Figures 2 and 3 at 55, between the root member 14 and the hub. The blade 6 is attached to the root member 14 for pivotal movement about axis $d'$ by a pivotal connection indicated at 56 in Figure 1 but is otherwise rigidly secured to the member 14. These pivotal movements are independent of drag movements of the member 14 relatively to the intermediate coupling member. The intermediate coupling member 16 is pivotally secured to the hub 7 by a pin 17 which permits the coupling member (and hence member 14 and blade 6 carried thereby) to perform the flapping movements about axis $b'$ independently of the drag movements of the blade-root member assembly. The member 16 is formed with extensions 18 to engage stops 19 carried by the hub 7 so as to restrict the range of flapping movement of each blade. Such an arrangement of stops may be provided in known manner. Similarly the drag movements of each blade are limited by stops (not shown).

Each lug 15 is formed on each side with an ear 20 which projects outwardly and lies generally in the plane of rotation of the blades 6 (see Figure 2). Each side ear 20 constitutes the socket member of a ball-and-socket joint and, as will be clear from Figure 2, pairs of sockets are arranged to face towards each other. Each pair of facing sockets receives a tie-bar generally indicated by the reference numeral 21. The tie-bar therefore extends from the root attachment member of one blade to the root attachment member of the next adjacent blade so that the blades of the rotor are all connected together. The tie-bars 21 permit pitch adjusting movements about an axis $d'$, flapping movements about axis $b'$ and drag movements about axis $c'$ to take place independently of each other.

The preferred construction of tie-bar is more clearly shown in Figure 4 to which reference should now be had. The tie-bar comprises an outer tube 22 and an inner tube 23 which is supported within and guided by the outer tube. The inner tube 23 has riveted to it, as at 24, a flange member 25 whilst the outer tube 22 carries a flange 26. The flanges 25 and 26 are spaced apart and there is disposed between them one or more rings, blocks or bushes 27 of a resilient material such as rubber. Attached to the free end of tube 22 and tube 23 is a ball member 28 which is adapted to enter a socket member 20. For convenience the latter is removably attached to the lug 15 by bolts 29. Each ball-and-socket connection 28, 20 provides a limited universal movement between the tie-bar 21 and the lug 15. The rubber bushes 27 of the tie-bars 21 are designed so that small cyclic displacements may be independently performed by each blade about the appropriate axis, such movements being absorbed by the bushes 27 and, therefore, not transmittted from one blade to another by a tie-bar. In the event, however, that large displacements are brought into play, the compression or tension to which the bushes 27 are subjected attains such a value that these movements are transmitted from one blade to the next adjacent blade by a tie-bar.

In so far as drag movements are concerned, independent movements of small magnitude are permitted to each blade by the bushes 27 whilst movements of large magnitude, which are too great to be accommodated by the rubber bushes, will be simultaneously performed by all the blades since the movements are positively transmitted from one blade to the other by the tie-bars. The tie-bars 21 can be adjusted so that initially the blades 6 are in equi-angular relationship as viewed in the plane of rotation of the blades, and with the arrangement described this relationship will be substantially maintained when drag movements of large magnitude occur.

In a similar manner, flapping movements of small magnitude can be independently performed by each blade the resilient bushes 27 accommodating such movements and damping them. However, movements of large magnitude—beyond the capacity of the bushes—will be transmitted from one blade to the others and will result in the coning angle of the rotor being changed.

It will be appreciated that instead of bushes 27 hydraulic means may be provided to connect the tubes 22, 23 of a tie-bar.

In any event the bushes 27 (or hydraulic means as the case may be) are selected to give a high degree of damping and high resistance to movement so that they are effective in eliminating or reducing vibrations or movements of one blade relative to the other. In the preferred construction described no damping other than that due to the friction of the drag hinges and hysteresis in the material of bushes 27 is provided for the blades so that the latter are free to adapt themselves to the movements of large magnitude without appreciable damping. It follows therefore that the blades will rapidly respond to changes in the operating or flight conditions of the aircraft and in this way high bending stresses are not imposed on the blades.

I claim:

1. A sustaining rotor for a rotary wing aircraft comprising a hub, means rotatably supporting the hub on the aircraft, at least a pair of rotor blades, each of said blades having a root member, a hinge connection between the root member and the hub permitting drag movements of the root member and blade, a pivotal connection between the blade and the root member permitting only pitch change movements of the blade, an arm for each blade carried by the hub for rotation therewith and connected to its blade to effect said pitch change movements of the blade relatively to the root member, a control member mounted in the hub and fixed against rotation for simultaneously adjusting said arms to change the pitch of the blades, a bearing means to support each arm from the control member for rotation of the arm relatively to the control member with rotation of the hub and additionally for limited angular movement relatively to the control member with drag movements of the blade, a tie extending from one root member to the adjacent root member and secured thereto to maintain the blades substantially in equiangular relationship and resilient means incorporated in the tie to damp the cyclic drag movements of small magnitude heavily.

2. A sustaining rotor for a rotary wing aircraft comprising a hub, means rotatably supporting the hub from the aircraft, at least a pair of rotor blades, each of said blades having a root member, a hinge connection between the root member and the hub permitting flapping movements of the root member-blade assembly, a pivotal connection between the blade and the root member permitting only pitch change movements of the blade, an arm carried by the hub for rotation therewith and connected to the blade to effect said pitch change movements relatively to the root member, a control member mounted in the hub and fixed against rotation for simultaneously adjusting said arms to change the pitch of the blades, a bearing means to support each arm from the control member for rotation of the arm relatively to the control member with rotation of the hub and a tie extending from one root member to the next adjacent root member and secured thereto to maintain the blades substantially in equi-angular relationship and resilient means incorporated in each tie to damp the cyclic flapping movements of small magnitude heavily.

3. A sustaining rotor for a rotary wing aircraft comprising a hub, means to support the hub from the aircraft for rotation, at least a pair of rotor blades, for each blade a root member, an intermediate coupling member, a hinge connection between the root member and the intermediate coupling member permitting drag movements of the root member-blade assembly relatively to the intermediate coupling member, a hinge connection between the hub and the intermediate coupling member permitting flapping movements of the intermediate coupling member relatively to the hub, a pivotal connection between the blade and the root member permitting only pitch change movements of the blade, an arm carried by the hub for rotation therewith and connected to the blade to effect said pitch change movements relatively to the root member, a control member mounted in the hub and fixed against rotation for simultaneously adjusting said arms to change the pitch of the blades, a bearing means to support each arm from the control member for rotation of the arm relatively to the control member with rotation of the hub and additionally for limited angular movement relatively to the control member with drag movements of the blade, a tie extending from one root member to the next adjacent root member and secured thereto to maintain the blades substantially in equi-angular relationship and resilient means incorporated in each tie to damp the cyclic drag and flapping movements of small magnitude heavily.

4. A sustaining rotor for a rotary wing aircraft comprising a hub, means to support the hub from the aircraft for rotation, at least a pair of rotor blades, for each blade a root member, a hinge connection between the root member and the hub permitting drag movements of the root member-blade assembly, a pivotal connection between the blade and the root member permitting only pitch change movements of the blade, an arm carried by the hub for rotation therewith and connected to the blade to effect said pitch change movements relatively to the root member, a control member mounted in the hub and fixed against rotation for simultaneously adjusting said arms to change the pitch of the blades, a bearing means to support each arm from the control member for rotation of the arm relatively to the control member with rotation of the hub, a two-part bar extending from one root member to the next adjacent root member with adjacent ends of said parts spaced apart axially of the bar, one part being secured to each root member and resilient means lying between adjacent ends of said parts and engaged thereby, said bar maintaining the blades substantially in equi-angular relationship and said resilient means permitting limited relative axial movements between the parts of the bar and being adapted to damp the cyclic drag movements of small magnitude heavily.

5. A sustaining rotor for a rotary wing aircraft comprising a hub, means to support the hub from the aircraft for rotation, a least a pair of rotor blades, for each blade a root member, a hinge connection between the root member and the hub permitting drag movements of the root member blade assembly, a pivotal connection between the blade and the root member permitting only pitch change movements of the blade, an arm carried by the hub for rotation therewith and connected to the blade to effect said pitch change movements relatively to the root member, a control member mounted in the hub and fixed against rotation for simultaneously adjusting said arms to change the pitch of the blades, a bearing means to support each arm from the control member for rotation of the arm relatively to the control member with rotation of the hub and additionally for limited angular movement relatively to the control member with drag movements of the blade, a two-part bar extending from one root member to the next adjacent root member with adjacent ends of said parts spaced apart axially of the bar, one part being secured to each root member, resilient means lying between the adjacent ends of said parts and engaged thereby and a universal joint to secure one of the parts of the bar each to one of the adjacent root members, said bars maintaining the blades substantially in equi-angular relationship and said resilient means permitting limited relative axial movements between the parts of the bar and being adapted to damp the cyclic drag movements of small magnitude heavily.

RAOUL HAFNER.

References Cited in the file of this patent

UNITED STATES PATENTS

| Number | Name | Date |
|---|---|---|
| 1,884,905 | Stanley | Oct. 25, 1932 |
| 1,899,096 | Larsen | Feb. 28, 1933 |
| 1,905,776 | Wilford | Apr. 25, 1933 |
| 1,943,458 | Cierva | Feb. 20, 1934 |
| 1,949,410 | Cierva | Mar. 6, 1934 |
| 2,250,826 | Everts | July 29, 1941 |
| 2,252,544 | Bennett | Aug. 12, 1941 |
| 2,265,366 | Hafner | Dec. 9, 1941 |
| 2,318,259 | Sikorsky | May 4, 1943 |
| 2,494,985 | Campbell | Jan. 17, 1950 |